United States Patent
Boinais

(10) Patent No.: US 10,232,802 B2
(45) Date of Patent: Mar. 19, 2019

(54) VEHICLE INTERIOR PANEL WITH COMPRESSIBLE LAYER OF NON-UNIFORM THICKNESS

(71) Applicant: Faurecia Interior Systems, Inc., Auburn Hills, MI (US)

(72) Inventor: Olivier Boinais, West Bloomfield, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 0 days.

(21) Appl. No.: 15/667,276

(22) Filed: Aug. 2, 2017

(65) Prior Publication Data

US 2019/0039535 A1    Feb. 7, 2019

(51) Int. Cl.
| | |
|---|---|
| *B60R 13/01* | (2006.01) |
| *B60R 13/02* | (2006.01) |
| *B60R 7/04* | (2006.01) |
| *B60N 2/75* | (2018.01) |
| *B60R 11/00* | (2006.01) |

(52) U.S. Cl.
CPC .......... *B60R 13/0262* (2013.01); *B60N 2/793* (2018.02); *B60R 7/04* (2013.01); *B60R 2011/0007* (2013.01); *B60R 2011/0094* (2013.01)

(58) Field of Classification Search
CPC .. B60R 7/04; B60R 7/046; B60R 7/05; B60R 7/06; B60R 13/0262; B60R 13/0268; B60R 2011/0007; B60R 2011/0094; B60R 2013/001; B60N 3/10; B60N 2/4686; B60N 2/793

USPC .... 296/39.1, 1.09, 191, 37.16, 37.13, 37.12, 296/24.34, 37.8; 160/229.1–232, 236
See application file for complete search history.

(56) References Cited

U.S. PATENT DOCUMENTS

| | | | |
|---|---|---|---|
| 7,475,954 B1 * | 1/2009 | Latunski | B60R 11/00 296/24.34 |
| 8,505,997 B2 * | 8/2013 | Hipshier | B60N 3/101 296/37.8 |
| 9,085,265 B2 | 7/2015 | Hipshier | |
| 2011/0000139 A1 * | 1/2011 | Gase | B60J 5/06 49/502 |
| 2013/0017356 A1 | 1/2013 | Hipshier | |

(Continued)

FOREIGN PATENT DOCUMENTS

| | | |
|---|---|---|
| EP | 0769605 A2 | 4/1997 |
| WO | WO2012003934 A1 | 1/2012 |

(Continued)

*Primary Examiner* — Dennis H Pedder
(74) *Attorney, Agent, or Firm* — Reising Ethington P.C.

(57) ABSTRACT

A vehicle interior panel includes an elastically compressible layer between a substrate and a decorative skin layer. The compressible layer has a non-uniform thickness along which voids are formed within the thickness of the panel. A center console can be equipped with the panel in the form of a tambour door that opens to access a storage space in the console and closes to serve as a cushioned armrest. The compressible layer can be formed from a foam material molded directly onto the decorative layer and shaped as a series of projections that are attached to flexibly interconnected crossmembers of the substrate. Thin portions of the compressible layer between the projections facilitate reversible bending of the panel during movement along curved guides.

20 Claims, 3 Drawing Sheets

(56) References Cited

U.S. PATENT DOCUMENTS

| | | | |
|---|---|---|---|
| 2014/0021733 A1 | 1/2014 | Hipshier et al. | |
| 2015/0258939 A1* | 9/2015 | Hipshier | B60R 7/04 |
| | | | 160/229.1 |
| 2016/0176364 A1* | 6/2016 | Reighard | B29C 67/0029 |
| | | | 296/1.08 |

FOREIGN PATENT DOCUMENTS

| | | |
|---|---|---|
| WO | WO2014183077 A1 | 11/2014 |
| WO | WO2015084976 A1 | 6/2015 |

\* cited by examiner

VEHICLE INTERIOR PANEL WITH COMPRESSIBLE LAYER OF NON-UNIFORM THICKNESS

TECHNICAL FIELD

This disclosure relates to vehicle interior panels and, in particular, to vehicle panels useful as moveable closures.

BACKGROUND

Vehicle interior panels can provide aesthetic appeal to the passenger compartment of a vehicle by concealing underlying structural components of the vehicle or hollow spaces within the vehicle, such as storage spaces or spaces along which vehicle wiring or conduits are located. Some interior vehicle panels provide other functionality in addition to aesthetic appeal, such as supporting passenger weight or passenger-imparted loads or accommodating other useful features, like indicator lights or cup holders. One example of a vehicle interior panel is a center console lid that can be opened to access a storage compartment. Such console lids are typically opened via a front latch which is released to pivot the lid about a rear hinge. With elongated console lids, the front end must be lifted quite high to access the storage space. This can place the passenger in a physically awkward position, with a raised arm and a twisted and forward-leaning torso.

Sliding doors are one alternative to hinged lids. U.S. Pat. No. 9,085,265 to Hipshier discloses a sliding door used to conceal a center console storage area. The door is formed from a series of parallel ribs attached to the bottom of a cushion that is made of a molded foam material. The ribs support the cushion and slide along rails to open and close the door. The molded foam cushion has a relatively high-density integral outer skin that encapsulates a lower density internal portion of the cushion. The skin and internal portion of the foam cushion are integral, meaning they are formed at one time from the same material by injecting a foaming material into a mold so that the skin forms against the cool mold surface early in the process before full foam expansion. The Hipshier skin has a relatively low limit on the overall thickness of the foam cushion and explicitly teaches a trade-off between high thickness comfort and low thickness flexibility.

SUMMARY

In accordance with one embodiment, a panel for use in a passenger cabin of a vehicle includes a substrate comprising a rigid member, an elastically compressible layer coupled with the substrate, and a decorative layer disposed over the compressible layer. The compressible layer has an inner surface facing toward the substrate, an oppositely facing outer surface, and a thickness defined between the inner and outer surfaces. The decorative layer has a visible surface facing an interior of the passenger cabin when the panel is installed in the vehicle. The thickness of the compressible layer varies along a lengthwise direction of the panel between a first thickness and a second thickness that is less than the first thickness. A void is formed between the substrate and the decorative layer and outside of the compressible layer at a region of the panel comprising the second thickness.

In some embodiments, the panel is configured for use as a door that is moveable between an open position and a closed position when installed in the vehicle. The rigid member of the substrate is coupled with a frame of an interior component of the vehicle so that an area of the interior component within the frame is concealed when the door is in the closed position and revealed when the door is in the open position.

In some embodiments, the substrate is slidingly coupled with a frame so that the door is a sliding door that slides along the frame in the lengthwise direction between open and closed positions.

In some embodiments, the panel includes guide followers at each opposite end of the rigid member. Each guide follower engages a guide of an interior component at opposite sides of a frame to couple the substrate to the frame so that the door follows a shape of the guide when moved between open and closed positions.

In some embodiments, wherein a shape of a guide includes a curve along which the panel is guided when moved between open and closed positions. The panel is sufficiently flexible to reversibly bend when guided along the curve.

In some embodiments, the rigid member is one of a plurality of rigid members of the substrate. Each rigid member extends between opposite ends in a widthwise direction of the panel and is flexibly interconnected with another of the plurality of rigid members. The panel resists bending about an axis lying in the lengthwise direction but is free to bend about an axis lying in the widthwise direction.

In some embodiments, the rigid member is one of a plurality of elongated crossmembers each extending along a crossmember axis between opposite ends. The substrate includes a web layer and the plurality of elongated crossmembers. Each crossmember is attached to the web layer at a location spaced apart from and parallel with an adjacent crossmember. Each crossmember axis is oriented in a widthwise direction of the panel.

In some embodiments, the elastically compressible layer is formed from a foam material.

In some embodiments, the elastically compressible layer includes a plurality of projections formed along the inner surface. The second thickness of the elastically compressible layer is at a base of at least one of the projections, and the first thickness of the elastically compressible layer is at a distal end of at least one of the projections. The void is located between adjacent projections.

In some embodiments, the panel is configured for use as an armrest when installed in the vehicle such that, when a force is applied to the visible surface of the decorative layer by an occupant of the passenger cabin in a direction toward the substrate, the elastically compressible layer is elastically compressed at a location of the first thickness and the void decreases in size.

In some embodiments, the panel is configured as a tambour door of a storage compartment and moveable between an open position and a closed position when installed in the vehicle. A storage space of the storage compartment is accessible when the door is in the open position and inaccessible when the door is in the closed position.

In some embodiments, a majority of the panel is in a horizontal orientation when in a closed position and in a vertical orientation when in an open position.

In some embodiments, the decorative layer includes a fabric layer and the panel includes a sculpted feature formed in the visible surface of the decorative layer. The elastically compressible layer is formed from a foam material and in full surface contact with the decorative layer along the entire sculpted feature.

In some embodiments, a center console for use in the passenger cabin of the vehicle includes the panel, a frame, and a pair of guides. The frame is configured for attachment to a floor of the vehicle and at least partly defines a storage space having an open top end. The pair of guides is in a fixed position with respect to the frame and located on transversely opposite sides of the storage space. Each guide has a first end, an opposite second end, and a curved portion between the first and second ends. Each first end is at the same transverse position but different vertical and longitudinal positions with respect to the corresponding second end. The panel is a tambour door with guide followers on opposite sides of the door that are engaged with the pair of guides for movement between an open position, in which the storage space is accessible from the top end, and a closed position, in which the storage space is an inaccessible closed storage space. At least a portion of the door is guided along the curved portion of the guide during movement between the open and closed positions. The door is sufficiently flexible to bend when at the curved portion of the guide and unbend when moved away from the curved portion of the guide.

In some embodiments, a center console includes the panel, a storage space, and a pocket that is separate from the storage space. The panel is a tambour door, and the pocket is sized to accommodate a thickness of the tambour door. A first end of each of a pair of guides is located along the storage space, and a second end of each of the pair of guides is located along the pocket such that at least a portion of the pocket is empty when the door is in a closed position and occupied by the door when the door is in an open position.

Within the scope of this disclosure it is contemplated that the various aspects, embodiments, examples, features and alternatives set forth above, in the claims, in the drawings, and/or in the following description may be taken independently or in any combination thereof. For example, features disclosed in connection with one embodiment are applicable to all embodiments, except where there is incompatibility of features.

DESCRIPTION OF THE DRAWINGS

One or more embodiments will hereinafter be described in conjunction with the appended drawings, wherein like designations denote like elements, and wherein.

DETAILED DESCRIPTION OF ILLUSTRATIVE EMBODIMENT(S)

Described below is a vehicle interior panel that is both flexible and compressible and useful in various vehicle interior applications. The following description refers to the examples illustrated in the figures, in which the panel is in the form of a tambour door that selectively closes a storage space. The door is sufficiently flexible to bend and unbend during opening and closing movement while doubling as an armrest when closed. A unique internal layer provides a structure that can be relatively thick for a bendable tambour door and relatively compressible for such a thick layer. While presented in the context of a tambour door, the panel is useful in other types of doors, closures, sliding panels, and non-moveable panels, offering other advantages, such as simple construction and cost or weight reduction over known panel structures.

Figure 1:
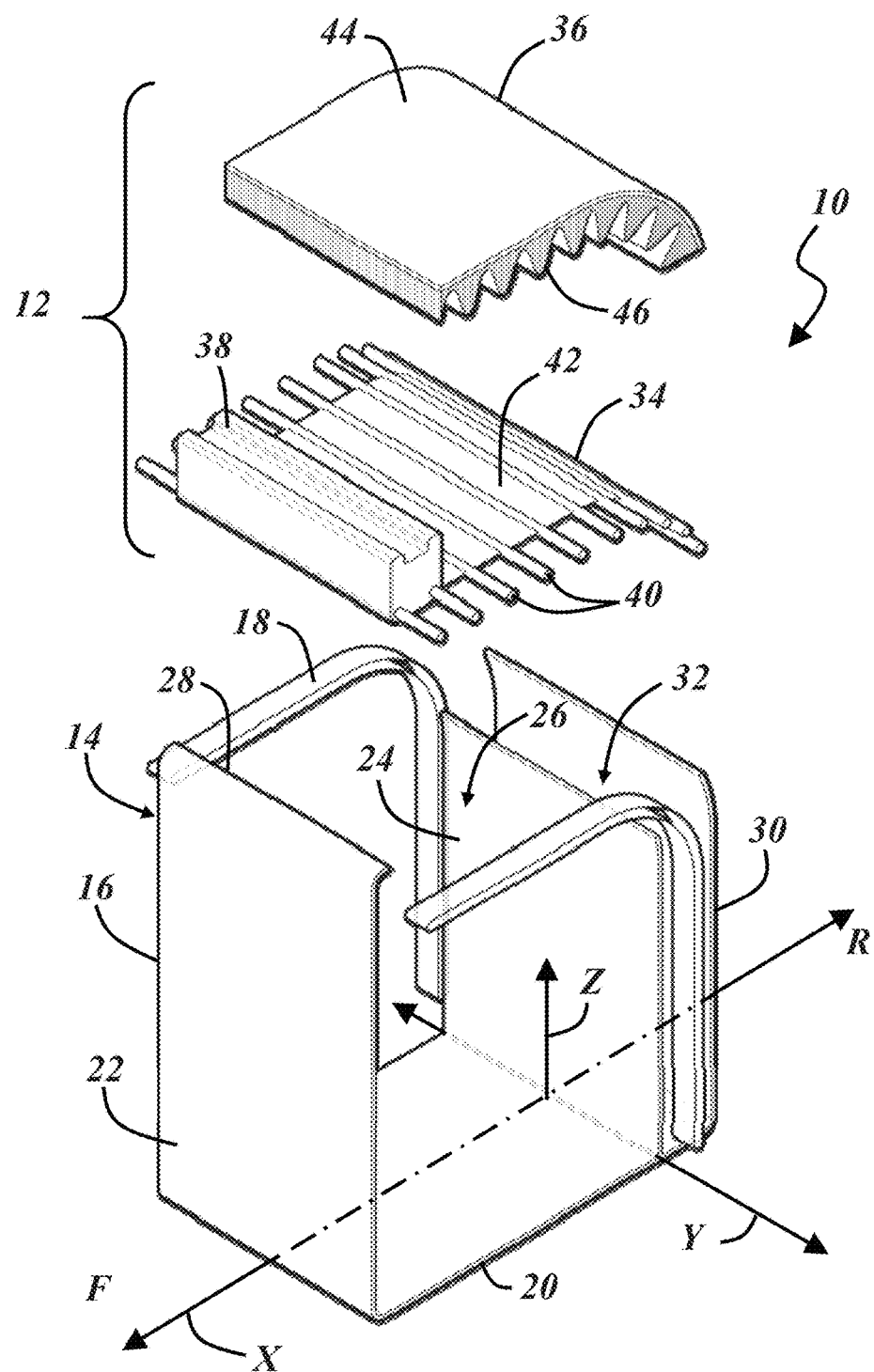
FIG. 1 is a partially exploded view of a storage compartment for use in a vehicle passenger cabin and equipped with a panel having a non-uniformly thick compressible layer and voids within the thickness of the panel.
Figure 2:
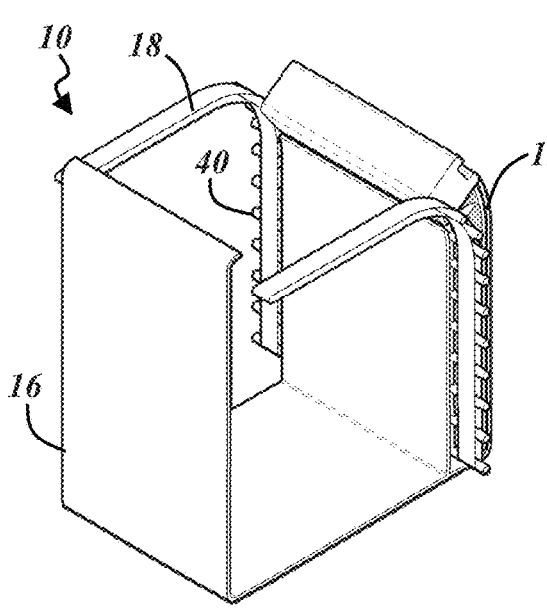
FIG. 2 is a perspective view of the storage compartment of FIG. 1, with the panel illustrated as a tambour door in an open position.

FIG. 1 is an exploded view of an example of a vehicle interior component 10 equipped with an embodiment of a vehicle interior panel 12. The illustrated interior component 10 is a center console of the type often located at the transverse center and between two seats in a vehicle passenger cabin. While not limited to this location or orientation, longitudinal directions (X) in which the front (F) and rear (R) of the vehicle face are illustrated for this example, along with a transverse (i.e., left and right) direction (Y) and vertical direction (Z). The console 10 includes a base 14 having a frame 16 and a pair of guides 18 mounted in a fixed position relative to the frame 16. The illustrated frame 16 is configured for direct or indirect attachment to a floor of the vehicle and includes a bottom 20 and front and rear walls 22, 24 that partly define a storage space 26 having an open end 28 at its top. In order to illustrate the guides 18, left and right side walls are omitted in the figures, but may be included as part of the frame or as part of another component that supports or defines the guides 18, for example. The illustrated example also includes a pocket wall 30 that partly defines a pocket 32 that can accommodate the panel 12 during opening and closing movement as a storage compartment door.

The panel 12 is in the form of a tambour door in this example and is illustrated as two separate subcomponents in FIG. 1, including a substrate 34 and a cover 36. The substrate 34 is shown with an attached handle 38. A tambour door is a segmented door including multiple segments joined together and arranged parallel with each other along their longest dimension. The segments are generally equally sized and equally spaced and aligned with one another along their lengthwise ends. A tambour door is constructed so that adjacent segments can easily pivot with respect to each other about an axis running parallel with the segments. This makes such a door bendable or foldable at multiple locations along the door—i.e., at the joint between every adjacent pair of segments—even when the individual segments are made from a very stiff or non-bendable material. A tambour door with high-stiffness segments can thus bend about various parallel axes lying along the length of the segments while resisting bending in a perpendicular direction. Tambour doors are designed so that the lengthwise ends of the segments are guided along a desired path in a direction perpendicular to the pivot axes of the segments. The segmented construction accommodates movement of the tambour door along a curved path.

In this sense, the illustrated substrate 34 is itself a functional tambour door, even without the cover 36. Indeed, conventional tambour doors, such as the cover of a roll-top desk or a segmented garage door, are usually built with the individual segments or slats showing such that, when the door follows a curved track, the inter-segment joints can be seen to sequentially open and close. Such joints represent pinch points and debris-collectors in the interior of a vehicle. One advantage of the illustrated cover 36 is elimination of those problems. The illustrated panel substrate 34 includes a plurality of rigid members 40 and a flexible web layer 42 that interconnects them. The illustrated cover 36 includes a decorative layer 44 and an elastically compressible layer 46. These components of the panel 12 are described further below.

Figure 3:
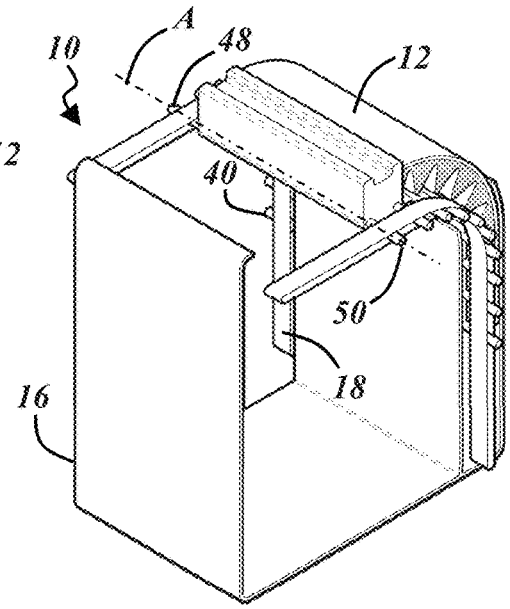
FIG. 3 is the perspective view of FIG. 2, with the tambour door moved away from the open position toward a closed position.
Figure 4:
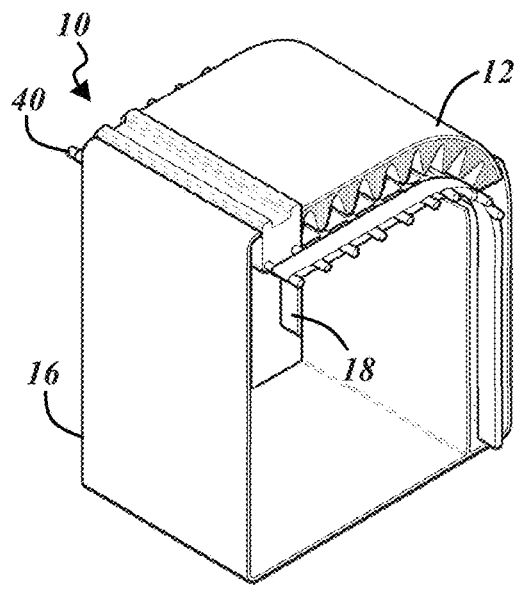
FIG. 4 is the perspective view of FIGS. 2 and 3, with the tambour door in the closed position.
Figure 5:
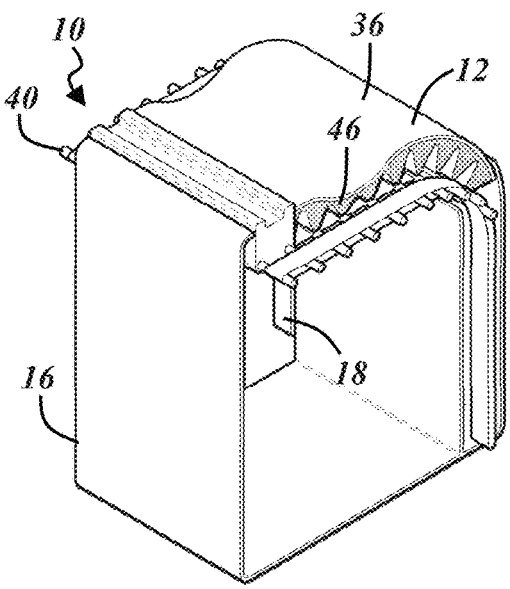
FIG. 5 is the perspective view of FIG. 4, with the tambour door in the closed position and in a compressed condition.

FIGS. 2-5 illustrate the console of FIG. 1 in various states, again with sidewalls of the base omitted for purposes of illustration. The panel 12 is configured for use as a door that is moveable between an open position (FIG. 2) and a closed position (FIGS. 4 and 5) when installed in the vehicle. The rigid members 40 of the substrate are coupled with the frame 16 of the console so that the storage area is concealed when the door 12 is in the closed position and revealed when the door is in the open position. FIG. 3 illustrates the door 10 in a partially open position, and FIG. 4 illustrates the elastically compressible layer 46 of the cover 36 in a compressed condition, as discussed further below.

In the illustrated embodiment, door movement is in a lengthwise direction of the door, and changes between the longitudinal direction and the vertical direction with respect to the vehicle. In the closed position, a majority of the panel 12 is in a generally horizontal orientation. In the open position, a majority of the panel 12 is in a generally vertical orientation. In other embodiments, the panel 12 may be configured as a door that conceals or reveals an area within a frame of a different interior component, such as a glove box storage area or an electronic display area, for example. The panel can be configured for use as a non-tambour door in some cases, and there is no requirement that the panel be guided along a curved path, even when configured as a tambour door.

In this example, the rigid members 40 are elongated crossmembers that each extend along a crossmember axis (A) between opposite ends 48, 50 that are spaced apart in the widthwise direction of the panel (FIG. 3). Each crossmember 40 is attached to the web layer 42 of the substrate 34 at a location spaced apart from and parallel with an adjacent crossmember. As used herein, the term "rigid" as used to describe the members 40 means sufficiently rigid to support the weight of the panel 12 against gravity only by the ends 48, 50 without noticeable sagging between the ends. Metals and glass- or mineral-reinforced polymers can be made suitably rigid at an exemplary crossmember diameter or thickness in a range between 3 mm and 10 mm.

The web layer 42 may be continuous or discontinuous. The primary function of the web layer is to permit each rigid member 40, in the absence of the guides 18, to have freedom of movement relative to an adjacent rigid member in both the vertical (Z) and longitudinal (X) directions, as oriented in the figures. This can be accomplished with several different configurations of the web layer. In one example, the web layer 42 is a thin sheet of material, such as a fabric layer with a relatively high in-plane tensile strength but negligible resistance to folding or bending out-of-plane. Such a fabric layer may be discontinuous in the lengthwise direction of the panel 10, running only between adjacent rigid members 40, or it may be one continuous layer of fabric with the rigid members attached at spaced apart locations. In another example, the web layer 42 is a continuous or discontinuous thin solid polymer film, which is flexible between adjacent rigid members 40 but not bendable without permanent plastic deformation. In another example, the web layer 42 is discontinuous and includes multiple rigid segments pivotally attached to a pair of rigid members 40 where each segment of the web layer meets the respective rigid members.

As shown in the figures, the substrate 34 may be slidingly coupled with the frame 16 so that the panel 12 is a sliding door that slides along the frame between the open and closed positions via guides 18 or other suitable means in the lengthwise direction. In this example, the crossmembers 40 are cylindrical rods, and the opposite ends 48, 50 of each crossmember is configured as a guide follower. Each guide follower 48, 50 engages one of the guides 18 at opposite sides of the frame 16 to couple the panel substrate to the frame so that the door 12 follows the shape of the guide when moved between the open and closed positions. The illustrated guides 18 are in the form of slots with a slot width slightly larger than the diameter of the guide followers 48, 50. These types of guides 18 can be formed as molded-in guides of a molded plastic sidewall or separately formed as an attachable metal rail with opposing parallel surfaces spaced apart by the necessary slot width. Other types of guides and guide followers are possible, such as wheel-like guide followers that ride along a track-like guide. Further, the configurations of the guides and guide followers can be reversed. For instance, the panel substrate may employ a flexible slotted feature along its opposite sides that slides along a series of dowels protruding from sidewalls of the console base.

Figure 6:
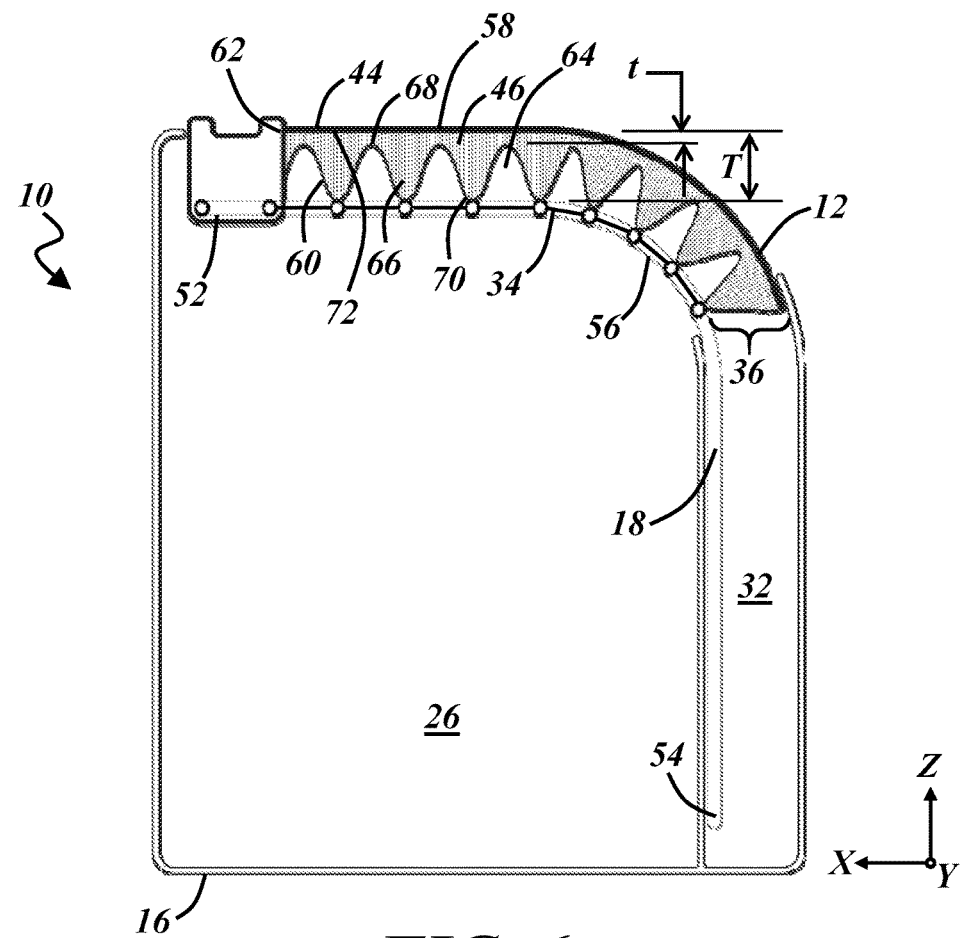
FIG. 6 is a side elevation view of the storage compartment with the tambour door in the closed position of FIG. 4.

Reference is now made to FIG. 6 for additional discussion of these and other features of the panel 12. FIG. 6 is a side elevation view of the console 10 of FIGS. 1-5 corresponding to FIG. 4 with panel 12 in the form of a tambour door in the closed position. Only one of the pair of guides 18 is visible in this view, but this description applies to both guides of the previously described pair. Each guide 18 is in a fixed position with respect to the frame 16 and located on transversely opposite sides of the storage space 26. Each guide has a first end 52, an opposite second end 54, and a curved portion 56 between the first and second ends. Each guide 18 runs parallel with the longitudinal direction (X) of the vehicle such that the first and second ends 52, 54 are at the same transverse position (Y) with respect to the vehicle, while the first and second ends are at different vertical (Z) and longitudinal positions with respect to the vehicle. In this particular example, the first end 52 of each guide 18 is a forward end and the second end 54 is a rearward end. Also, the first end 52 of each guide 18 is an upper end and the second end 54 is a lower end. The one of the guide followers 50 is moved to the first end 52 when the door 12 is in the closed position, while another of the guide followers on the opposite lengthwise end of the door is moved to the second end 54 when the door is in the open position.

This view of the console 10 depicted in FIG. 6 also illustrates the pocket 32 into which the door 12 is moved when in the open position. The pocket 32 is separate from the storage space 26 and is sized to accommodate the full thickness of the door, including the substrate 34 and the decorative and compressible layers 44, 46 of the cover 36. The pocket 32 is also sized to accommodate the width of the panel 12 and at least some of the length of the panel. The first end 52 of each guide 18 is located along the storage space 26, and the second end 54 of each guide is located along the pocket 32 such that at least a portion of the pocket is empty when the door 12 is in the closed position and occupied by the door when the door is in the open position. At least a portion of the door 12 is guided along the curved portion 56 of the guide 18 during movement between the open and closed positions, and the door is sufficiently flexible to bend when at the curved portion of the guide and unbend when moved away from the curved portion of the guide.

While, as noted above, conventional tambour doors are constructed with the gaps or hinge points between the individual segments exposed, the tambour door 12 of the illustrated embodiment includes the visible decorative layer 44 and the elastically compressible layer 46 interposed between the substrate 34 and the decorative layer which together conceal the substrate 34.

The primary function of the decorative layer 44 is aesthetic—i.e., to present a desired appearance, color, texture, etc. to the interior of the passenger cabin. The decorative layer 44 is a relatively thin layer and may have a thickness in a range between 0.5 mm and 2.0 mm, preferably less than 1.5 mm. In some embodiments, the decorative layer 44 is a decorative skin layer made up primarily of a thermoplastic polymeric material such as TPO, TPE, PVC, TPU, etc. Preferably, the decorative layer 44 is formed from or comprises a fabric or textile layer that is not a solid polymeric film layer. Such a fabric layer may be a layer of spun or woven fibers, and the fibers may be synthetic, natural, or a blend thereof. The fabric layer can help render the decorative layer non-stretchable while simultaneously providing a luxurious aesthetic to the vehicle interior, where the fabric layer is visible. Providing the decorative layer with non-stretch characteristics is helpful to ensure the continued desirable appearance of the visible portion of the panel 12 over long periods of time through multiple open-and-close cycles. For instance, while multiple bending cycles may tend to stretch a thin TPO film-based outer skin layer, which may appear as wrinkles in a visible surface 58 of the cover 36 over time, a textile layer made up of woven fibers of a similar synthetic material will not stretch and visibly relax in the same manner as a solid polymer film.

The primary function of the elastically compressible layer 46 is to provide cushioning between the rigid materials of the substrate 34 and the decorative layer 44 so that the underlying substrate cannot be perceived as easily by a vehicle occupant who rests part of his or her weight on the panel 12 when in the closed position doubling as an armrest. The elastically compressible layer 46 is made from a material that can be noticeably compressed via application of a force while returning to its original shape when the force is removed. In one embodiment, the elastically compressible layer 46 is formed form a polymeric foam material, such as polyurethane foam. Other polymeric-based foams may be used as well. Due in part to the shape of the illustrated compressible layer 46, discussed further below, non-foam materials (e.g., certain TPEs) may be used for the compressible layer 46 in some cases.

The elastically compressible layer 46 is coupled with the substrate 34 and has an inner surface 60 facing toward the substrate and an oppositely facing outer surface 62. The elastically compressible layer 46 has a non-uniform thickness defined between these inner and outer surfaces 60, 62. The thickness of the elastically compressible layer 46 varies along the lengthwise direction of the panel 12 between a first thickness (T) and a second thickness (t) that is less than the first thickness. In this particular example, the first thickness is a maximum thickness, and the second thickness is a minimum thickness. A void 64 is formed between the substrate 34 and the decorative layer 44 and outside of the elastically compressible layer 46 at regions of the panel 12 where the layer 46 is at its second thickness (t). In the illustrated embodiment, the compressible layer 46 includes a plurality of projections 66 formed along its inner surface 60 so that a plurality of voids 64 is defined between the substrate 34 and the inner surface of the compressible layer 46.

The elastically compressible layer 46 may be formed as a uniform pattern of equally sized and spaced projections 66 as shown. In this case, each projection 66 extends from a base 68, where the layer 46 is at the minimum thickness (t), to a distal end 70, where the layer 46 is at the maximum thickness (T). In this case, the inner surface 60 of the compressible layer 46 has a generally sinusoidal shape along the lengthwise direction of the panel 12, which gives each projection 66 a tapered configuration with rounded peaks at the ends 70 of the projections and rounded valleys at the bases 68 of adjacent projections. The outer surface 62 of the compressible layer 46 is in contact with an inside surface 72 of the decorative layer 44, which is opposite the outside visible surface 58. The entire outer surface 62 of the compressible layer 46 is in interfacial contact with the inside surface of the decorative layer 44 in this example, and the distal end 70 of each projection 66 of the compressible layer 46 is affixed to one of the rigid members 40 of the substrate 34 via adhesive attachment or other suitable method.

Figure 7:
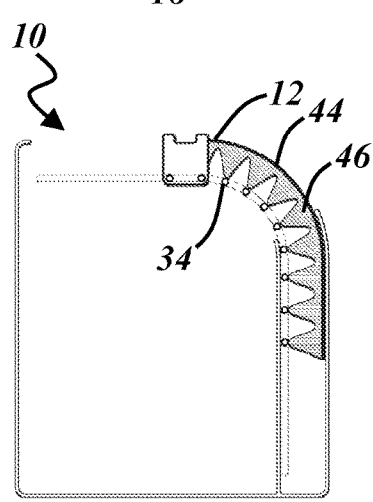
FIG. 7 is a side elevation view of the storage compartment with the tambour door in the position of FIG. 3.

Inclusion of the voids 62 within the thickness of the panel 12 can provide the panel with a number of unconventional and previously impossible characteristics. For example, as the panel moves between the closed position of FIG. 6 to the open position, a relatively thick compressible layer can be made to flex and elastically bend to follow the substrate 34 along the curved portion 56 of the guides 18, as shown in FIG. 7 where the panel is illustrated at an intermediate position between the open and closed positions. This is due in part to the bending and flexing of the elastically compressible layer 46 being localized at the minimum thickness portions.

Explained by way of one non-limiting comparative example, a foam compressible layer having a maximum thickness (T) of 75 mm and a minimum thickness (t) of 5 mm can be made to easily flex and bend through the curved portion of the illustrated guides 18, while a conventional vehicle interior panel with a solid foam layer (i.e., no voids) between an underlying substrate and an outer decorative layer would not be able to undergo the illustrated movement without excessive force, damage to the panel, and/or delamination of the foam layer. This is due in part to the relatively large difference in tensile and compressive forces at respective outer and inner sides of a solid bending beam. The illustrated configuration reduces the effective bending thickness compared to a solid foam layer, localizing the bending to the regions of minimum thickness.

Figure 8:
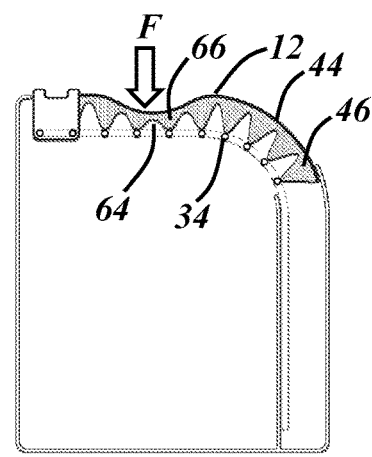
FIG. 8 is a side elevation view of the storage compartment with the tambour door in the compressed condition of FIG. 5.

The cushioning properties of the cover 36 that is usable as part of a tambour door can thus be enhanced. For instance, while it may be possible to reversibly bend a very thin and/or very soft layer of foam through the curved portion of the guide 18, such a thin and/or soft layer does not offer much in the way of cushioning—i.e., a vehicle occupant resting an arm on the closed door will feel the relatively rigid underlying substrate. And such a thin layer cannot be used to provide any appreciable additional height to the panel to position the arm-resting surface at a more usable level than the top of the console storage space opening. The illustrated configuration facilitates a relatively large amount of compression—to approximately 25-75% of the uncompressed thickness of the compressible layer in the illustrated example—via a combination of compression of the projections 66 at the regions of maximum thickness and simultaneous reduction of the size of the voids 62 during compression when a force (F) is applied to the decorative layer 44, as illustrated in FIG. 8.

As such, the cover 36 can be made to have a maximum thickness in a relatively large range between 5 mm and 100 mm, preferably larger than 15 mm or larger than 25 mm. Alternatively, the above-described compressible layer 46 can be formed from a material that is substantially more rigid than conventional vehicle interior panel foam materials, owing to the additional compressibility provided by the voids defined by the non-uniform thickness of the layer 46. The non-uniformly thick compressible layer thus offers several additional variables that affect the amount of compressibility of the panel, such as void size and shape, projection size and shape, minimum and maximum layer thickness, the difference between minimum and maximum thickness, spacing between projections, etc., as opposed to being limited to foam stiffness and thickness when employing a conventional foam layer. The above-described compressible layer may thus find uses in other vehicle interior panels, whether or not part of a tambour door or any other type of movable panel.

In some embodiments, the decorative layer 44 of the above-described panel 12 is provided with one or more sculpted features formed therein. Sculpted features are named for their appearance, which is reminiscent of shapes cut or carved out of a solid piece of material. Such features may be characterized by certain visual and dimensional characteristics, including sharp (i.e., small radius) surface transitions joining surface portions with significantly different slopes. Sculpted features and techniques for forming them, particularly in the visible surface of decorative layers comprising a fabric layer, are disclosed in commonly assigned U.S. Patent Application Publication No. 2016/0176364 by Reighard, which is hereby incorporated by reference in its entirety. In some embodiments, the Reighard substrate can be omitted in favor of a removable film layer when forming the side of the foam layer opposite the decorative layer in the desired shape—i.e., when forming the inner surface 60 of the above-described elastically compressible layer 46 directly onto the inside surface 72 of the decorative layer 44.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A panel for use in a passenger cabin of a vehicle, the panel comprising:
    a substrate comprising a rigid member;
    an elastically compressible layer coupled with the substrate and having an inner surface facing toward the substrate and an oppositely facing outer surface, wherein the elastically compressible layer has a thickness defined between the inner surface and the outer surface; and
    a decorative layer disposed over the elastically compressible layer and having a visible surface facing an interior of the passenger cabin when the panel is installed in the vehicle,
    wherein the thickness of the elastically compressible layer varies along a lengthwise direction of the panel between a first thickness and a second thickness that is less than the first thickness,
    wherein a void is formed between the substrate and the decorative layer and outside of the elastically compressible layer at a region of the panel comprising the second thickness, and
    wherein the panel is configured such that, when a force is applied to the visible surface of the decorative layer by an occupant of the passenger cabin in a direction toward the substrate, the elastically compressible layer is elastically compressed at a location of the first thickness and the void decreases in size.

2. A panel as defined in claim 1, wherein the panel is configured for use as a door that is moveable between an open position and a closed position when installed in the vehicle, the rigid member of the substrate being coupled with a frame of an interior component of the vehicle so that an area of the interior component within the frame is concealed when the door is in the closed position and revealed when the door is in the open position.

3. A panel as defined in claim 2, wherein the substrate is slidingly coupled with the frame so that the door is a sliding door that slides along the frame in the lengthwise direction between the open and closed positions.

4. A panel as defined in claim 2, further comprising guide followers at each opposite end of the rigid member, wherein each guide follower engages a guide of the interior component at opposite sides of the frame to couple the substrate to the frame so that the door follows a shape of the guide when moved between the open and closed positions.

5. A panel as defined in claim 4, wherein the shape of each guide comprises a curve along which the panel is guided when moved between the open and closed positions, the panel being sufficiently flexible to allow the panel to reversibly bend when guided along the curve.

6. A panel as defined in claim 1, wherein the rigid member is one of a plurality of rigid members of the substrate, each rigid member extending between opposite ends in a widthwise direction of the panel and being flexibly interconnected with another of the plurality of rigid members, whereby the panel resists bending about an axis lying in the lengthwise direction but is free to bend about an axis lying in the widthwise direction.

7. A panel as defined in claim 1, wherein the rigid member is one of a plurality of elongated crossmembers each extending along a crossmember axis between opposite ends, the substrate comprising a web layer and the plurality of elongated crossmembers, each crossmember being attached to the web layer at a location spaced apart from and parallel with an adjacent crossmember with each crossmember axis being oriented in a widthwise direction of the panel.

8. A panel as defined in claim 1, wherein the elastically compressible layer is formed from a foam material.

9. A panel as defined in claim 1, wherein the elastically compressible layer comprises a plurality of projections formed along the inner surface, the second thickness of the elastically compressible layer being at a base of at least one of the projections and the first thickness of the elastically compressible layer being at a distal end of at least one of the projections with the void being located between adjacent projections.

10. A panel as defined in claim 1, wherein the panel is configured for use as an armrest when installed in the vehicle.

11. A panel as defined in claim 1, wherein the panel is configured as a tambour door of a storage compartment and moveable between an open position and a closed position when installed in the vehicle, a storage space of the storage compartment being accessible when the door is in the open position and inaccessible when the door is in the closed position.

12. A panel as defined in claim 11, wherein a majority of the tambour door is in a horizontal orientation when in the closed position and in a vertical orientation when in the open position.

13. A center console for use in the passenger cabin of the vehicle and comprising the panel of claim 1, the center console further comprising:
  a frame configured for attachment to a floor of the vehicle and at least partly defining a storage space having an open top end; and
  a pair of guides in a fixed position with respect to the frame and located on transversely opposite sides of the storage space, each guide having a first end, an opposite second end, and a curved portion between the first and second ends, wherein each first end is at the same transverse position as the respective second end but at different vertical and longitudinal positions as the corresponding second end,
  wherein the panel is a tambour door with guide followers on opposite sides of the door that are engaged with the pair of guides for movement between an open position, in which the storage space is accessible from the top end, and a closed position, in which the storage space is an inaccessible closed storage space, and
  wherein at least a portion of the door is guided along the curved portion of the guide during movement between the open and closed positions, the door being sufficiently flexible to bend when at the curved portion of the guide and unbend when moved away from the curved portion of the guide.

14. A center console as defined in claim 13, further comprising a pocket that is separate from the storage space and sized to accommodate a thickness of the tambour door, wherein the first end of each guide is located along the storage space and the second end of each guide is located along the pocket such that at least a portion of the pocket is empty when the door is in the closed position and occupied by the door when the door is in the open position.

15. A panel as defined in claim 1, wherein the void is between the substrate and the inner surface of the elastically compressible layer.

16. A panel as defined in claim 1, wherein the rigid member is one of a plurality of rigid members and the substrate further comprises a web layer, each rigid member being attached to the web layer at a location spaced apart from and parallel with an adjacent rigid member, wherein the void is between the web layer than the inner surface of the elastically compressible layer.

17. A panel as defined in claim 1, wherein the elastically compressible layer includes a plurality of projections formed along the inner surface so that a plurality of voids is defined between the substrate and the inner surface of the elastically compressible layer.

18. A panel as defined in claim 1, wherein the elastically compressible layer includes a plurality of projections formed along the inner surface, a distal end of each projection is affixed to one of a plurality of rigid members of the substrate, and the void is between adjacent rigid members.

19. A panel as defined in claim 1, wherein the elastically compressible layer and the decorative layer form a cover having a thickness greater than 25 mm, exclusive of the substrate.

20. A panel for use in a passenger cabin of a vehicle, the panel comprising:
  a substrate comprising a rigid member;
  an elastically compressible layer coupled with the substrate and having an inner surface facing toward the substrate and an oppositely facing outer surface, wherein the elastically compressible layer has a thickness defined between the inner surface and the outer surface; and
  a decorative layer disposed over the elastically compressible layer and having a visible surface facing an interior of the passenger cabin when the panel is installed in the vehicle,
  wherein the thickness of the elastically compressible layer varies along a lengthwise direction of the panel between a first thickness and a second thickness that is less than the first thickness,
  wherein a void is formed between the substrate and the decorative layer at a region of the panel comprising the second thickness, and
  wherein the void and the substrate are outside of the elastically compressible layer.

* * * * *